United States Patent

Theurer et al.

Patent Number: 5,826,860
Date of Patent: Oct. 27, 1998

[54] MACHINE FOR LAYING AN OVERHEAD LINE OF A TRACK

[75] Inventors: Josef Theurer, Vienna; Leopold Rudolf Gruber, Scheibbs, both of Austria

[73] Assignee: Franz Plasser Bahnbaumaschinen-Industriegesellschaft m.b.H., Vienna, Austria

[21] Appl. No.: 733,283

[22] Filed: Oct. 17, 1996

[30] Foreign Application Priority Data

Dec. 1, 1995 [AT] Austria .................................. 1968/95

[51] Int. Cl.⁶ ..................................................... H02G 1/02
[52] U.S. Cl. .................................. 254/134.3 R; 242/403; 242/155 BW; 242/397.3; 254/134.5
[58] Field of Search .................... 254/134.3 R, 134.3 PA, 254/134.3 FT, 134.5, 134.6; 242/155 BW, 403, 388.6, 388.7, 397.3

[56] References Cited

U.S. PATENT DOCUMENTS 4,213,596  7/1980  Inoue et al. .
5,048,797  9/1991  Theurer et al. .

FOREIGN PATENT DOCUMENTS 398 737    1/1995   Austria .
526 889    5/1931   Germany .
2 012 248 10/1971   Germany .
2 211 247  2/1973   Germany .

Primary Examiner—David A. Scherbel
Assistant Examiner—Lee Wilson
Attorney, Agent, or Firm—Collard & Roe, P.C.

[57] ABSTRACT

A machine for laying a catenary cable or a trolley wire of an overhead line extending above a track comprises a machine frame supported on undercarriages for mobility along the track, a storage drum mounted on the machine frame and carrying a reel of the catenary cable or trolley wire to be paid out from the storage drum, a guide device for the paid-out catenary cable or trolley wire comprising a guide roller arranged to be engaged by the paid-out catenary cable or trolley wire and a drive for vertically adjusting the guide device. The guide device is pivotal about a horizontal axis extending in the longitudinal direction of the machine frame, and a drive is arranged for pivoting the guide device about the horizontal axis.

8 Claims, 2 Drawing Sheets

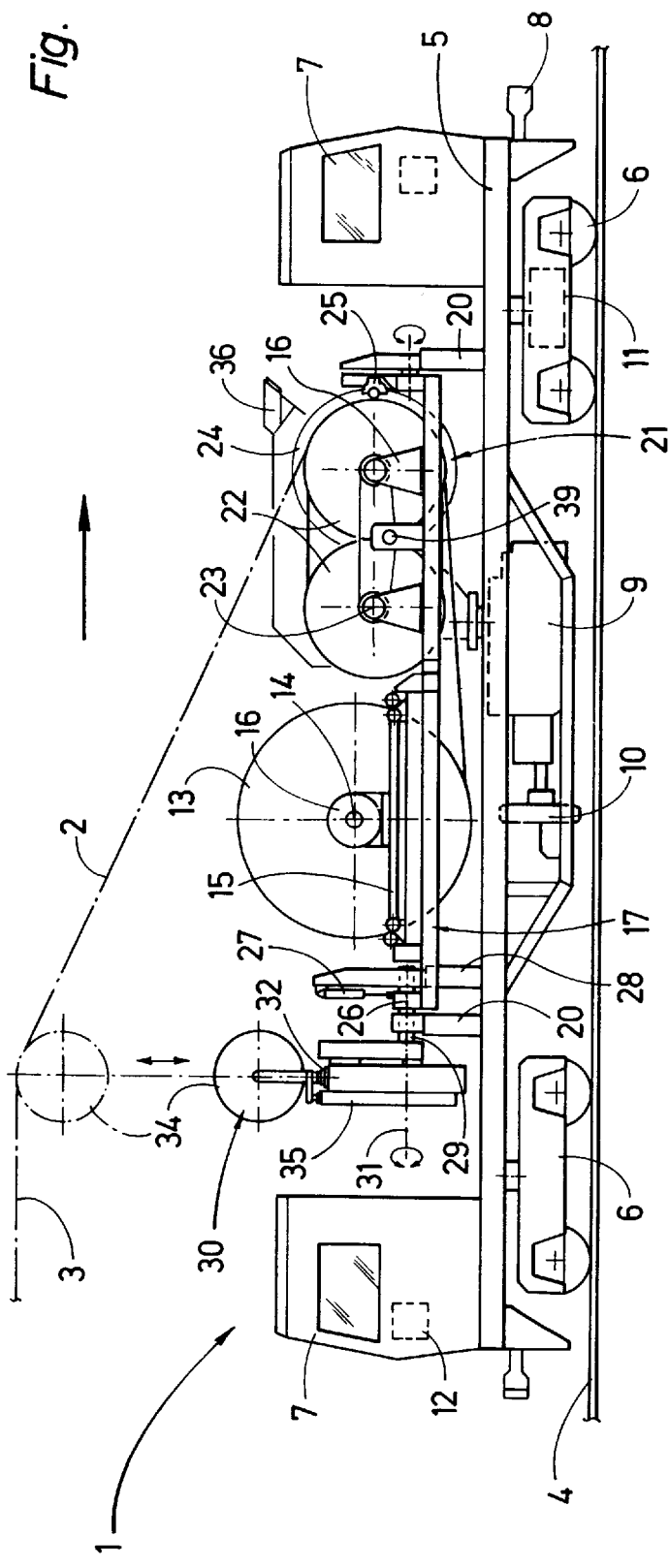

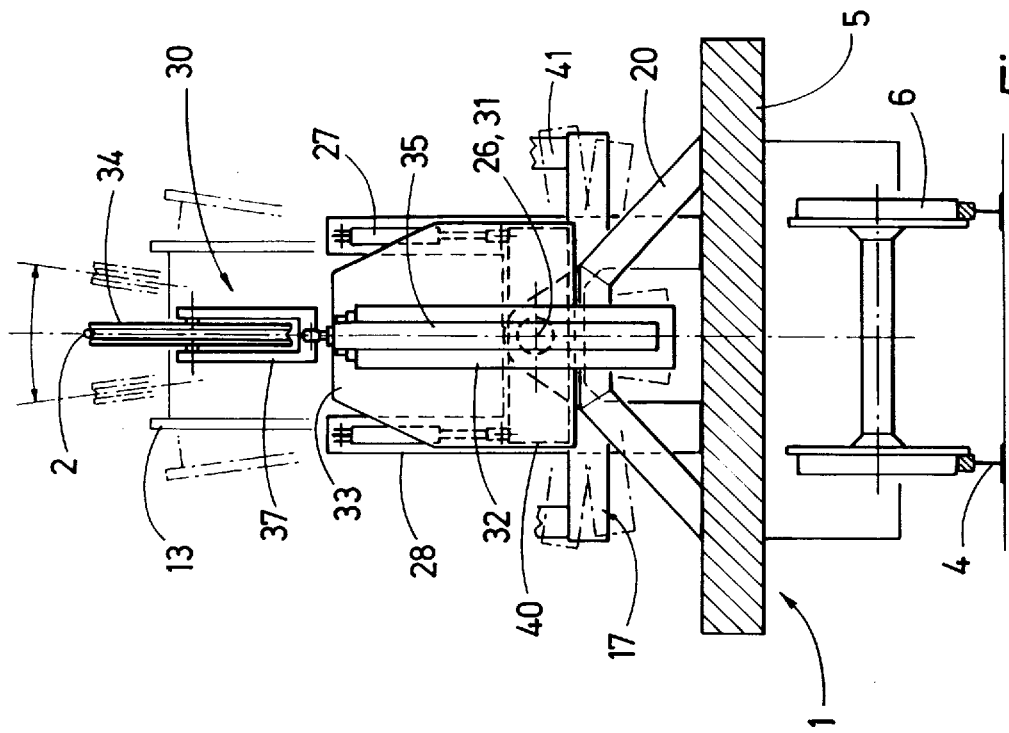
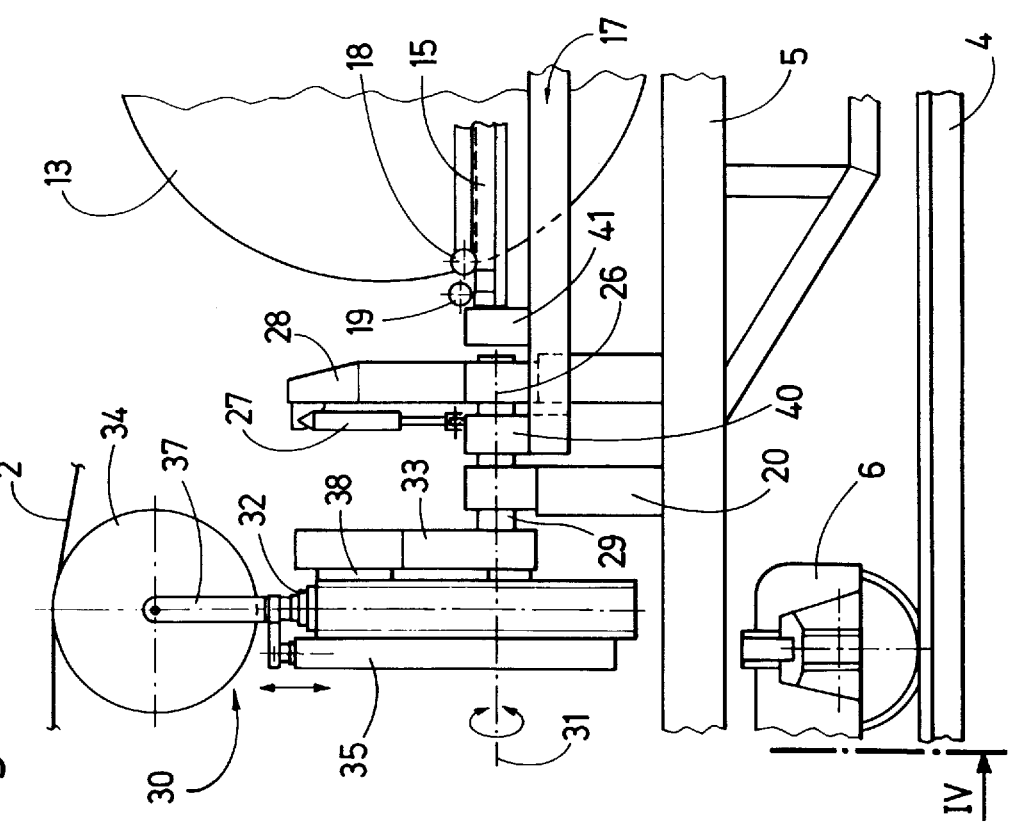

MACHINE FOR LAYING AN OVERHEAD LINE OF A TRACK

BACKGROUND OF THE INVENTION

1. Field of the Invention

The present invention relates to a machine for laying an elongated flexible element of an overhead line extending above a track, the elongated flexible element being a catenary cable or a trolley wire, which comprises a machine frame extending in a longitudinal direction and supported on undercarriages for mobility along the track, a storage drum mounted on the machine frame and carrying a reel of the elongated flexible element to be paid out from the storage drum, and a guide device for the paid-out elongated flexible element comprising a guide roller arranged to be engaged by the paid-out elongated flexible element and a drive for vertically adjusting the guide device.

2. Description of the Prior Art

U.S. Pat. No. 5,048,797, dated Sep. 17, 1991, discloses a machine of this type, with which a trolley wire and a catenary cable from which the trolley wire is suspended may be laid together under the desired tension to provide an overhead line extending above a track. The trolley wire and the catenary cable are continuously paid out from respective storage drums mounted on the machine frame and run through a tensioning device before they are vertically and laterally correctly positioned by a guide device for fixing the overhead line in the desired end position. The guide device consists of a vertically adjustable crane with a boom, which is mounted on the machine frame for rotation about a vertical axis, and the free end of the boom carries two guide rollers for respectively guiding the catenary cable and the trolley wire. The fork-shaped mount for the guide rollers is movably connected to the boom to enable each guide roller to be individually turned about an axis extending approximately in the longitudinal direction of the track while the crane is rotated for laterally moving the boom back and forth to obtain the desired zig-zag course of the overhead line.

Another mobile machine for installing an overhead line extending above a track is disclosed in German patent No. 2,211,247, issued Feb. 19, 1981. The machine frame runs on the track and carries a vertically adjustable platform on which tensioning and guide devices for a catenary cable and a trolley wire are mounted. The guide device is comprised of a lifting arm which is vertically adjustable and laterally pivotal about a vertical axis. The lifting arm carries guide rollers for the trolley wire and the catenary cable which are paid out from storage drums mounted on the machine frame.

Another machine is disclosed in Austrian patent No. 398,737, issued Jan. 25, 1995. The machine has two storage drums, one for a trolley wire and one for a catenary cable, and independently operable guide devices associated with the storage drums. The guide devices are vertically adjustable booms which are mounted on the machine frame for lateral pivoting and carry a guiding and clamping device on their free ends.

In the overhead line installation machine disclosed in German patent No. 2,012,248, published Oct. 7, 1971, a respective guide roller for a catenary cable and a trolley wire is provided. The guide rollers are mounted on a telescoping device arranged on the machine frame and are vertically and horizontally adjustable.

Finally, it is also known—for example from U.S. Pat. No. 4,213,596, dated Jul. 22, 1980, and German patent No. 526,889, issued May 21, 1931—to mount the storage drums and the vertically and laterally adjustable guide devices for a catenary cable and a trolley wire on separate railroad cars, which are coupled together to form a train during the installation of an overhead line.

SUMMARY OF THE INVENTION

It is the primary object of this invention to provide a machine of the first-described type which has a simple structure and may be readily put to unlimited use in the installation of overhead lines.

The above and other objects are accomplished in a machine of the first-indicated type according to the invention by mounting the guide device for pivoting about a horizontal axis extending in the longitudinal direction, and providing a drive for pivoting the guide device about the horizontal axis.

Such a guide device enables the trolley wire and/or the catenary cable to be vertically and laterally positioned very accurately with an exceedingly simple structure. Pivoting about the horizontal axis causes the guide roller to be adjusted transversely relative to the track so that the zig-zag positioning may be obtained without problem in connection with the vertical adjustment of the guide roller. The very simple structure assures a long operating life and little wear so that the drives may be controlled dependably in an uncomplicated manner.

According to a preferred embodiment, the machine further comprises a carrier frame, the storage drum being mounted on the carrier frame, the carrier frame being mounted on the machine frame for pivoting about a horizontal axis extending in the longitudinal direction and being connected to the pivoting drive for pivoting the carrier frame. Most advantageously, the guide device is mounted on the carrier frame. This assures a precise and constant orientation of the trolley wire or catenary cable with respect to the guide roller, which dependably prevents the possibility of its gliding off the guide roller.

BRIEF DESCRIPTION OF THE DRAWING

The above and other objects, advantages and features of the present invention will become more apparent from the following detailed description of a now preferred embodiment thereof, taken in conjunction with the accompanying drawing wherein FIGS. 1 and 2 are, respectively, side elevational and top views of a machine for laying a trolley wire or a catenary cable of an overhead line extending above a track;

FIG. 3 is an enlarged fragmentary side elevational view showing the guide device of this invention; and FIG. 4 is an end view, partly in section, along line IV of FIG. 3.

DETAILED DESCRIPTION OF PREFERRED EMBODIMENT

Referring now to the drawing and first to FIGS. 1 and 2, there is shown machine 1 for laying elongated flexible element 2 of overhead line 3 extending above track 4. The elongated flexible element may be a catenary cable or a trolley wire. The machine comprises machine frame 5 extending in a longitudinal direction and supported on two undercarriages 6 for mobility along track 4 in a direction indicated by the arrow in FIG. 1. A driver's or operator's cab 7 is mounted on machine frame 5 at each end thereof, and the machine frame ends have couplings 8 so that machine 1 may be incorporated into a work train. Motor 9 and hydraulic assembly 10 serve to deliver power to drive 11 of machine 1 and to all the other operating drives to be described hereinafter, and these drives are remote-controlled by control 12 arranged in cab 7. Machine 1 also carries vertically and laterally pivotal crane 36.

Storage drum 13 is mounted on machine frame 5 and carries a reel of elongated flexible element 2 to be paid out from the storage drum. As shown, the storage drum is journaled in bearing blocks 16 for rotation about horizontal axis 14 extending transversely to the machine frame, and the bearing blocks are mounted on carriage 15. The carriage is mounted on carrier frame 17 by means of bearings 41 (see FIGS. 3 and 4), and adjustment drives 19 are connected to carriage 15 to enable it to be transversely displaced relative to carrier frame 17 along glide rods 18.

A tensioning device 21 is connected to carrier frame 17 and is arranged adjacent storage drum 13 to direct paid-out elongated flexible element 2 from the storage drum to a guide roller 34 under a selected tension. The tensioning device comprises two deflecting rolls 22 spaced from storage drum 13 in the longitudinal direction and about which the elongated flexible element is wound. The deflecting rolls are journaled in bearing blocks 16' for rotation about axes 23, which extend parallel to axis 14, and these bearing blocks are mounted on carrier frame 17. One of the deflecting rolls has brake disc 24 actuatable by braking device 25. To maintain a constant tension of elongated flexible element 2, deflecting rolls 22 are rotated by hydraulic motor 39.

Machine 1 further comprises guide device 30 for the paid-out elongated flexible element and the guide device comprises guide roller 34 arranged to be engaged by paid-out elongated flexible element 2 and drive 35 for vertically adjusting the guide device. Guide device 30 is pivotal about horizontal axis 31 extending in the longitudinal direction, and drive 27 is arranged for pivoting the guide device about the horizontal axis.

As best shown in FIGS. 3 and 4, carrier frame 17 is mounted on the machine frame on two supports 20, 20 between cabs 7 and is journaled in these supports for pivoting about a horizontal axis 26 extending in the longitudinal direction. This horizontal axis extends through shaft 29 at the end of carrier frame 17 adjacent storage drum 13 and this shaft is journaled in one support 20 and a bracket 28 also mounted on machine frame 5 and spaced from the one support in the longitudinal direction of the machine frame. Carrier frame 17 is tiltable in bracket 28 like a cradle (see phantom lines in FIG. 4).

Shaft 29, which extends in the direction of the longitudinal extension of machine frame 5, projects from a side of support 20 opposite the side facing carrier frame 17 and serves as a bearing for guide device 30 which is rigidly connected to shaft 29 for rotation therewith. In this way, guide device 30, which is positioned outside the longitudinal portion of machine frame 5 defined between supports 20, is pivotal about horizontal pivot axis 31 extending in the longitudinal direction, horizontal axes 31 and 26, about which guide device 30 and carrier frame 17 are pivotal, extending coaxially. The piston of two pivoting drives 27 are connected to block 40 on carrier frame 17 and the cylinders of the pivoting drives are connected to bracket 28 for pivoting the carrier frame together with guide device 30 by means of shaft 29, the guide device being mounted on the carrier frame.

Guide device 30 comprises a number of coaxially telescoped, substantially vertically extending tubes 32. The outermost tube is affixed to a holder 33 at upper range 38 of the tube spaced from pivot axis 31, and this holder is fixedly mounted on shaft 29 so that it is connected with carrier frame 17. Guide roller 34 is journaled in a fork-shaped bearing 37 at the upper end of an innermost tube 32. This guide roller has an annular groove receiving paid-out trolley wire or catenary cable 2 and serves to guide it under a selected tension imparted to it by tensioning device 21. Telescoped tubes 32 are vertically extensible by telescopingly extensible vertical adjustment drive 35 linked to fork-shaped bearing 37 so that guide roller 34 is vertically adjustable.

The hereinabove described machine is operated in the following manner:

Guide roller 34 of guide device 30 is vertically adjusted by drive 35 until elongated flexible element 2 guided in the groove of the guide roller is positioned at the desired height (see phantom line in FIG. 1). The elongated flexible element is now laid while machine 1 is continuously advanced along track 4 while tensioning device 21 imparts to the elongated flexible element a selected tension desired for laying the elongated flexible element. To provide a zig-zag course for the laid elongated flexible element, pivoting drive 27 rocks carrier frame 17 with guide device 30 and its vertical adjustment drive 35 back and forth (see phantom lines at the top of FIG. 4). At the same time and independently, carriage 15 and storage drum 13 carried thereon is transversely displaced on carrier frame 17 by transverse adjustment drives 19 to maintain trolley wire or catenary cable 2 paid out from storage drum 13 in line with tensioning device 21. Crane 36 is used to replace an empty storage drum by a full one carrying a reel of the elongated flexible element.

Rather than guiding elongated flexible element 2 in the manner illustrated in FIG. 1, it is alternatively possible to engage the elongated flexible element with guide roller 34 from below and to lay it in a direction of movement of the machine in a direction opposite to the one indicated by the arrow. Advantageously, this requires no reversing of the machine but merely a reversal of drive 11 to move the machine in the opposite direction.

Also, the invention is not limited to the illustrated structural embodiment. Many structural changes within the boundaries of the claims may occur to those of ordinary skill in the art. For example, guide device 30 may be mounted directly on carrier frame 17 between supports 20, or it may be mounted on machine frame 5. It is also possible to equip guide device 30 with two vertically spaced guide rollers 34 so that the trolley wire and the catenary cables may be laid simultaneously, as shown in U.S. Pat. No. 5,048,797, for example.

What is claimed is:

1. A machine for laying an elongated flexible element of an overhead line extending above a track, the elongated flexible element being a catenary cable or a trolley wire, which comprises
   (a) machine frame extending in a longitudinal direction and supported on undercarriages for mobility along the track,
   (b) a storage drum mounted on the machine frame and carrying a reel of the elongated flexible element to be paid out from the storage drum,
   (c) a guide device for the paid-out elongated flexible element comprising
      (1) a guide roller arranged to be engaged by the paid-out elongated flexible element and
      (2) a drive for vertically adjusting the guide device,
      (3) the guide device being pivotal about a horizontal axis extending in the longitudinal direction, and (d) a drive for pivoting the guide device about the horizontal axis.

2. A machine for laying an elongated flexible element of an overhead line extending above a track, the elongated flexible element being a catenary cable or a trolley wire, which comprises
- (a) a machine frame extending in a longitudinal direction and supported on undercarriages for mobility along the track,
- (b) a storage drum mounted on the machine frame and carrying a reel of the elongated flexible element to be paid out from the storage drum,
- (c) a guide device for the paid-out elongated flexible element comprising
  - (1) a guide roller arranged to be engaged by the paid-out elongated flexible element and
  - (2) a drive for vertically adjusting the guide device,
  - (3) the guide device being pivotal about a horizontal axis extending in the longitudinal direction,
- (d) a drive for pivoting the guide device about the horizontal axis, and
- (e) a carrier frame,
  - (1) the storage drum being mounted on the carrier frame, and
  - (2) the carrier frame being mounted on the machine frame for pivoting about a horizontal axis extending in the longitudinal direction and being connected to the pivoting drive for pivoting the carrier frame.

3. The machine of claim 2, wherein the guide device is mounted on the carrier frame.

4. The machine of claim 9, wherein the horizontal axes about which the guide device and the carrier frame are pivotal extend coaxially.

5. The machine of claim 9, further comprising a tensioning device connected to the carrier frame arranged to direct the paid-out elongated flexible element from the storage drum to the guide roller under a selected tension, the tensioning device comprising two deflecting rolls about which the elongated flexible element is wound.

6. The machine of claim 2, further comprising two supports mounted on the machine frame and carrying the carrier frame therebetween, the guide device being arranged adjacent one of the supports at a side thereof opposite the side facing the carrier frame.

7. A machine for laying an elongated flexible element of an overhead line extending above a track, the elongated flexible element being a catenary cable or a trolley wire, which comprises
- (a) a machine frame extending in a longitudinal direction and supported on undercarriages for mobility along the track,
- (b) a storage drum mounted on the machine frame and carrying a reel of the elongated flexible element to be paid out from the storage drum,
- (c) a guide device for the paid-out elongated flexible element comprising
  - (1) a number of coaxially telescoped tubes,
  - (2) a guide roller affixed to an upper end of an innermost of the telescoped tubes and arranged to be engaged by the paid-out elongated flexible element, and
  - (3) a drive for vertically displacing the tubes for vertically adjusting the guide device,
  - (4) the guide device being pivotal about a horizontal axis extending in the longitudinal direction, and
- (d) a drive for pivoting the guide device about the horizontal axis.

8. The machine of claim 7, wherein an upper part of an outermost of the telescoped tubes is affixed to the carrier frame at a vertical distance from the horizontal axis.

* * * * *